Patented Jan. 16, 1923.

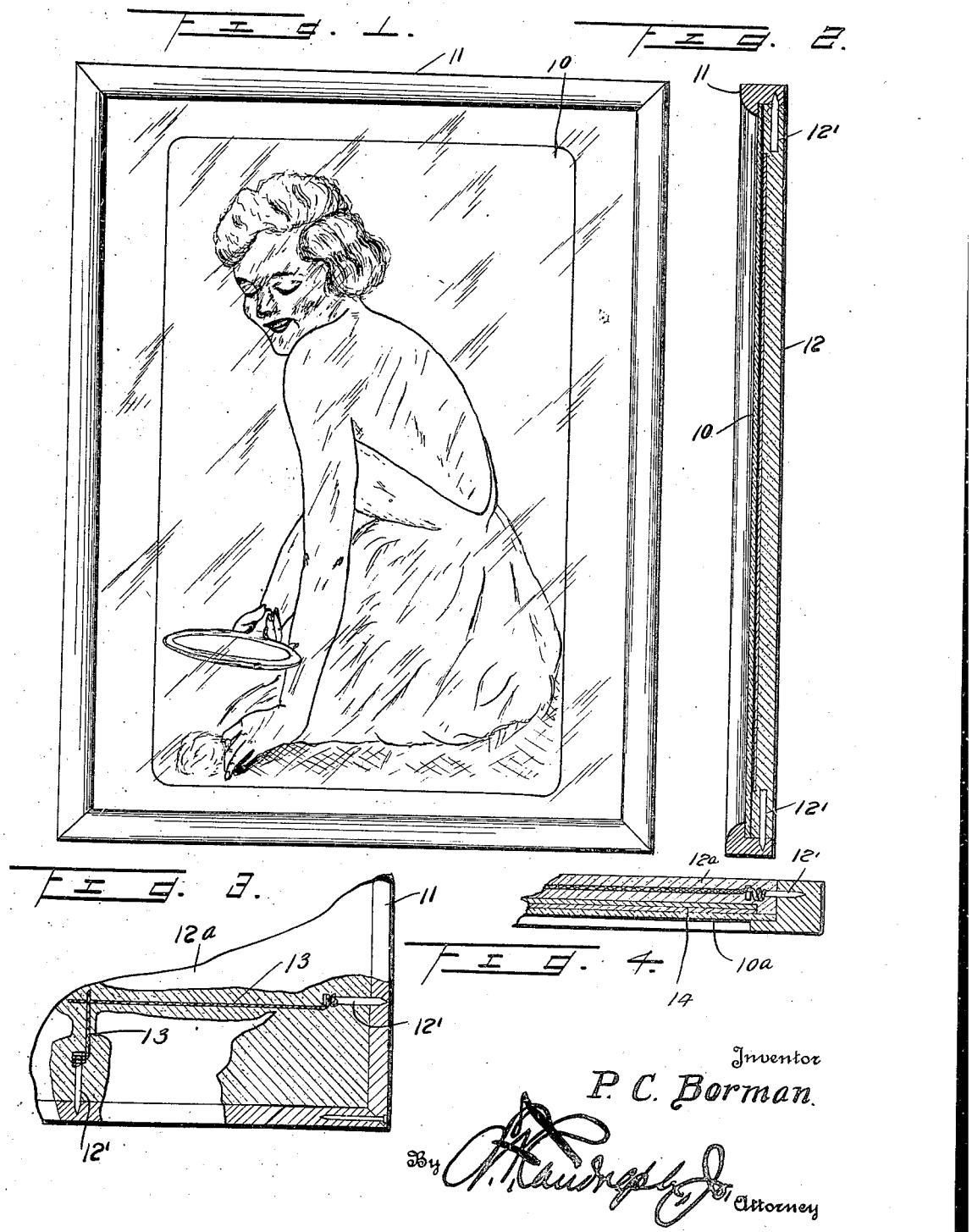

1,442,639

UNITED STATES PATENT OFFICE.

PAUL CASPER BORMAN, OF CINCINNATI, OHIO.

METHOD OF MOUNTING PICTURES.

Application filed February 10, 1921, Serial No. 443,963. Renewed November 16, 1922.

*To all whom it may concern:*

Be it known that I, PAUL CASPER BORMAN, a citizen of the United States, residing at Cincinnati, in the county of Hamilton and State of Ohio, have invented certain new and useful Improvements in Methods of Mounting Pictures; and I do hereby declare the following to be a full, clear, and exact description of the invention, such as will enable others skilled in the art to which it appertains to make and use the same.

The object of the invention is to provide a simple and inexpensive method of mounting or framing pictures under such conditions as to insure the preservation thereof against the effect of moisture, dust and the like resulting under ordinary conditions in warping and discoloring the subject, and to this end the invention consists in a procedure and construction hereinafter fully described and specifically illustrated in the accompanying drawings, wherein:

Figure 1 is a front view of a mounting constructed in accordance with the invention.

Figure 2 is a sectional view of the same.

Figure 3 is a rear view of a portion of the mounting partly broken away to show one of the anchoring elements for the filler.

Figure 4 is a sectional view showing a slight modification of the invention.

In carrying out the invention the picture, whether a cut-out or otherwise is applied with its face to the surface of a transparent moisture proof medium 10, such as a sheet of glass of the selected dimensions suitable to the field or area of the picture to be mounted. The face of the picture is secured to the said medium by means of a suitable adhesive material such as transparent glue or sizing. The transparent subject-carrying medium is positioned in a suitable frame 11 and to the back of the medium and fully occupying the area of the frame is applied a plastic filler 12 of plaster of Paris or like cement held in place against possible removal from the frame by suitable anchors or anchoring devices 12', consisting in the construction illustrated of pins driven into the sides of the frame and projecting into the space occupied by the filler so as to be embedded in the latter.

The subject is thus entirely enclosed within a bed formed by the filler with the face thereof exposed through the transparent water-proof medium which serves as a means of carrying not only the subject but the filler which adhesively clings thereto and is substantially anchored in the frame as a protection to the edges thereof and serving obviously to give a marginal finish to the mounting and which obviously may be of any preferred design and depth to suit the character of the subject which is to be displayed.

Moreover as indicated in Figure 3, and particularly when the picture to be framed is of comparatively large area, it is desirable to supplement the anchoring devices or pins 12' by connecting ties 13 of wire, cords or the like attached for example to the pins and arranged in intersecting relation to constitute a reinforcement to guard against the cracking or displacement of the filler.

In the modified construction illustrated in Figure 4 a sheet of card board 14 or the like is arranged in superposed relation with the subject as a backing for the same so that the subject is interposed between the transparent medium $10^a$ and said cardboard or backing, and with the cement filler $12^a$ disposed as previously described in coextensive relation with the tranparent medium and covering, and fully protecting the picture or subject and also said backing member or sheet.

Having thus described the invention, what I claim is:—

1. A picture mounting, a frame, a transparent panel therein having a subject applied thereto, a filler over said subject in adhering relation to the frame, a plurality of securing members penetrating the frame, said securing members being embedded in said filler, and reinforcing elements for the filler embedded therein and spanning the securing members.

2. A picture mounting, a frame, a transparent panel therein, a subject arranged for exposition through the transparent panel, a filler over said subject in adhering relation to the frame, a plurality of securing members penetrating the frame, said securing members being included in said filler, and reinforcing elements for the filler embedded therein and spanning the securing members.

In testimony whereof I affix my signature in presence of two witnesses.

PAUL CASPER BORMAN.

Witnesses:
  NORA BORMAN,
  A. J. MURDULE.